US011977555B2

(12) United States Patent
Lee et al.

(10) Patent No.: US 11,977,555 B2
(45) Date of Patent: May 7, 2024

(54) BIOMETRIC DATA DISTRIBUTED MANAGEMENT SYSTEM, AND BIOMETRIC RECOGNITION METHOD USING SAME

(71) Applicant: ALCHERA INC., Seongnam-si (KR)

(72) Inventors: Seungyeon Lee, Seoul (KR); Kang Eui Lee, Seoul (KR)

(73) Assignee: ALCHERA INC., Seongnam-si (KR)

( * ) Notice: Subject to any disclaimer, the term of this patent is extended or adjusted under 35 U.S.C. 154(b) by 23 days.

(21) Appl. No.: 17/417,659

(22) PCT Filed: Nov. 18, 2020

(86) PCT No.: PCT/KR2020/016266
§ 371 (c)(1),
(2) Date: Sep. 27, 2022

(87) PCT Pub. No.: WO2021/153889
PCT Pub. Date: Aug. 5, 2021

(65) Prior Publication Data
US 2023/0026106 A1 Jan. 26, 2023

(30) Foreign Application Priority Data
Jan. 30, 2020 (KR) .................. 10-2020-0011125

(51) Int. Cl.
*G06F 16/2458* (2019.01)
*G06F 16/182* (2019.01)
(Continued)

(52) U.S. Cl.
CPC .......... *G06F 16/2471* (2019.01); *G06F 16/27* (2019.01); *G06F 21/32* (2013.01);
(Continued)

(58) Field of Classification Search
CPC ...... G06F 16/2471; G06F 16/27; G06F 21/32; G06V 40/172; G06V 40/168; G06V 40/50
See application file for complete search history.

(56) References Cited

U.S. PATENT DOCUMENTS

2007/0041545 A1* 2/2007 Gainsboro .............. H04M 3/36
379/188
2010/0115597 A1  5/2010 Murakawa
(Continued)

FOREIGN PATENT DOCUMENTS

JP  2008-59509 A    3/2008
JP  2015-022593 A   2/2015
(Continued)

*Primary Examiner* — Etienne P Leroux
(74) *Attorney, Agent, or Firm* — Sughrue Mion, PLLC

(57) ABSTRACT

A method for performing biometric recognition in a system in which biometric information is distributed and stored in a plurality of databases includes extracting biometric information of a user, generating a plurality of biometric information segments by dividing the extracted biometric information, calculating distances between pre-stored biometric information template segments for each of the plurality of databases and a corresponding one of the plurality of biometric information segments, and detecting a biometric information template matching the biometric information by using the calculated distances.

13 Claims, 11 Drawing Sheets

(51) Int. Cl.
*G06F 16/27* (2019.01)
*G06F 21/32* (2013.01)
*G06V 40/16* (2022.01)
*G06V 40/50* (2022.01)

(52) U.S. Cl.
CPC .......... *G06V 40/168* (2022.01); *G06V 40/172* (2022.01); *G06V 40/50* (2022.01)

(56) References Cited

U.S. PATENT DOCUMENTS

| | | | |
|---|---|---|---|
| 2012/0185397 A1* | 7/2012 | Levovitz | G06Q 20/40 |
| | | | 705/44 |
| 2015/0341350 A1* | 11/2015 | Mandal | H04L 63/0838 |
| | | | 726/6 |
| 2015/0347781 A1 | 12/2015 | Patey et al. | |
| 2016/0110586 A1 | 4/2016 | Hayasaka | |
| 2016/0219049 A1* | 7/2016 | Headley | H04L 67/306 |
| 2017/0104752 A1* | 4/2017 | Sakemi | H04L 9/0618 |
| 2018/0234244 A1* | 8/2018 | Starner | H04L 63/0861 |
| 2020/0186522 A1* | 6/2020 | Apturkar | H04L 9/3231 |
| 2021/0342432 A1* | 11/2021 | Goldwerger | G06F 21/32 |
| 2022/0029829 A1* | 1/2022 | Fukuda | H04L 9/3247 |

FOREIGN PATENT DOCUMENTS

| | | |
|---|---|---|
| JP | 2016-81212 A | 5/2016 |
| JP | 2018-206442 A | 12/2018 |
| KR | 10-1774151 B1 | 9/2017 |
| WO | 2016/129454 A1 | 8/2016 |

* cited by examiner

BIOMETRIC DATA DISTRIBUTED MANAGEMENT SYSTEM, AND BIOMETRIC RECOGNITION METHOD USING SAME

TECHNICAL FIELD

The embodiments disclosed herein relate to a distributed biometric information management system for performing biometric recognition and a method for performing biometric recognition using the same.

BACKGROUND ART

Biometric recognition (biometrics) refers to verifying or identifying a specific person by using biometric data such as a unique physical characteristic, voice, gait, or the like that an individual has.

Although biometric recognition technology has advantages in that there is no risk of a user losing biometric information and it is difficult to duplicate or steal biometric information, there is a risk of personal information being infringed when biometric information including a personal physical characteristic is divulged.

In order to overcome this disadvantage, there is used a technology that, when a biometric information template is registered in a biometric system, divides the biometric information template and stores resulting segments in a plurality of databases in a distributed manner. In the case where biometric information is managed in the distributed manner, even when information is divulged from any one of the databases, personal information can be protected because the biometric information of a user is not completely exposed.

However, in the conventional distributed biometric information management system, when biometric recognition is performed, segments of biometric information templates stored in each database are transmitted to another database, combined, and then recognized. When the number of segments of biometric information templates to be transmitted is large, a problem arises in that network load increases due to a large amount of data to be transmitted.

Accordingly, there is a need to develop a biometric method capable of maintaining a high level of recognition accuracy while reducing the amount of data to be transmitted.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to provide a biometric recognition method capable of maintaining a high level of recognition accuracy while reducing the amount of data to be transmitted for performing biometric recognition, and a distributed biometric information management system for performing the same.

Technical Solution

In order to overcome the above-described technical problem, there is provided a method that generates a plurality of biometric information segments by dividing biometric information extracted from a user, calculates distances between pre-stored biometric information template segments and a corresponding one of the biometric information segments for each of a plurality of databases, and detects a biometric information template matching the biometric information by using the calculated distances.

Advantageous Effects

According to the embodiments disclosed herein, it may be possible to calculate and transmit distances between biometric information template segments previously registered for each database and biometric information segments extracted from a user, rather than transmitting biometric information template segments distributed and stored in a plurality of databases, so that an advantage arises in that the amount of data to be transmitted may be significantly reduced.

Furthermore, according to another technical solution, among biometric information template segments distributed and stored in a plurality of databases, biometric information template segments having a low probability of matching biometric information extracted from a user are excluded, and the remaining biometric information template segments are transmitted, so that there is the advantage of maintaining recognition accuracy at a high level while reducing the amount of data to be transmitted.

The effects that can be obtained by the embodiments disclosed herein are not limited to the above-described effects, and other effects that have not been described above will be clearly understood by those having ordinary skill in the art, to which the present invention pertains, from the following description.

BEST MODE

Figure 1:
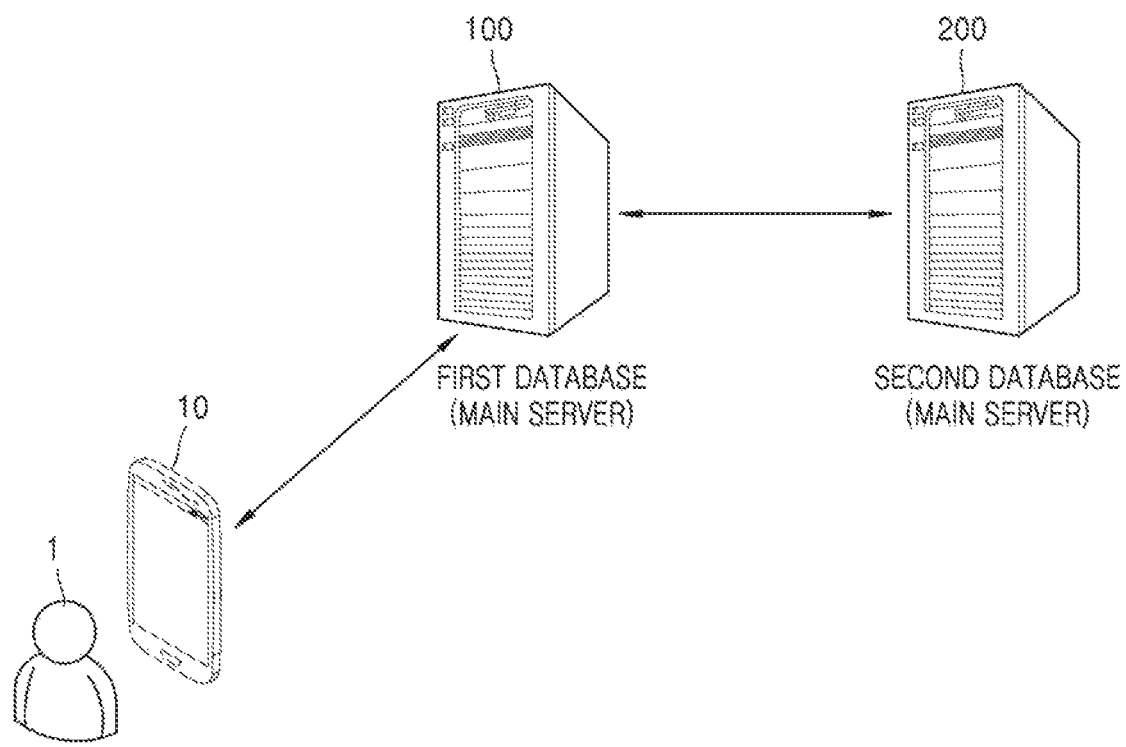
FIG. 1 is a diagram showing a distributed biometric information management system according to an embodiment.

As a technical solution for accomplishing the above objects, according to an embodiment, there is provided a method for performing biometric recognition in a system in which biometric information is distributed and stored in a plurality of databases, the method including: extracting biometric information of a user; generating a plurality of biometric information segments by dividing the extracted biometric information; calculating distances between pre-stored biometric information template segments for each of the plurality of databases and a corresponding one of the plurality of biometric information segments; and detecting a biometric information template matching the biometric information by using the calculated distances.

According to another embodiment, there is provided a computer program for performing a method for performing biometric recognition in a system in which biometric information is distributed and stored in a plurality of databases, the method including: extracting biometric information of a user; generating a plurality of biometric information segments by dividing the extracted biometric information; calculating distances between pre-stored biometric information template segments for each of the plurality of databases and a corresponding one of the plurality of biometric information segments; and detecting a biometric information template matching the biometric information by using the calculated distances.

According to still another embodiment, there is provided a computer-readable storage medium having stored thereon a program for performing a method for performing biometric recognition in a system in which biometric information is distributed and stored in a plurality of databases, the method including: extracting biometric information of a user; generating a plurality of biometric information segments by dividing the extracted biometric information; calculating distances between pre-stored biometric information template segments for each of the plurality of databases and a corresponding one of the plurality of biometric information segments; and detecting a biometric information template matching the biometric information by using the calculated distances.

According to still another embodiment, there is provided a distributed biometric information management system including a plurality of databases, the distributed biometric information management system including: a main server configured to be a database selected from the plurality of databases and to control a biometric process; and at least one distributed server configured to be a database belonging to the plurality of databases and excluding the main server; wherein the main server generates a plurality of biometric information segments by dividing the biometric information extracted from the user; wherein each of the main server and the at least one distributed server calculates distances between pre-stored biometric information template segments and a corresponding one of the biometric information segments; and wherein the main server detects a biometric information template matching the biometric information by using the calculated distances.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted.

Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

First, the meanings of the terms used in the following embodiments will be described.

In the following embodiments, the term 'biometric information' refers to the unique information of an individual, such as a physical characteristic, a voice, a gait, or the like, and 'biometric recognition' refers to the performance of verification or identification using biometric information.

Furthermore, the term 'biometric information template' refers to biometric information of a user that is stored in advance for biometric recognition. In other words, when there is a request for biometric recognition from the user, biometric recognition can be performed by extracting biometric information from the user and comparing the extracted biometric information with the pre-stored biometric information template.

Furthermore, the term 'biometric information template segment' refers to a segment of a biometric information template. In detail, in order to protect personal information in a distributed biometric information management system, a biometric information template is divided and stored in a plurality of databases in a distributed manner. In this case, a segment of the biometric information template is called a biometric information template segment.

Furthermore, the term 'biometric information segment' refers to a segment of biometric information. In detail, when biometric recognition is performed, biometric information extracted from a user is divided for comparison with pre-stored biometric information template segments. In this case, the segment of biometric information is called a biometric information segment.

Figure 2:
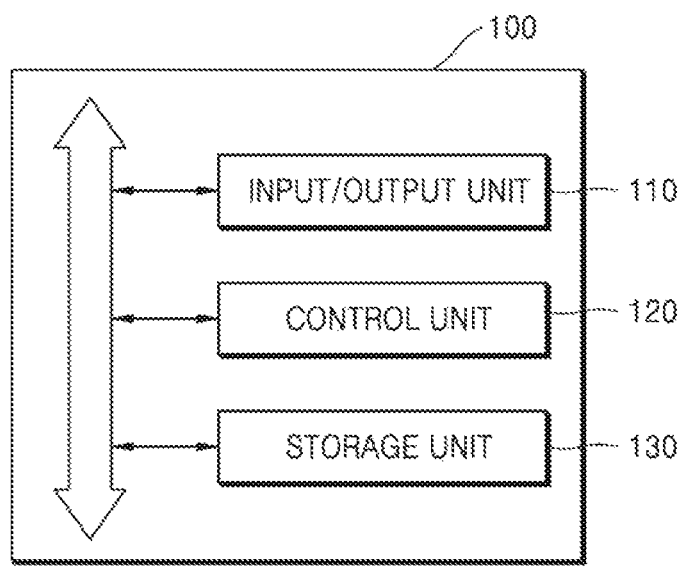
FIG. 2 is a diagram showing the configuration of a first database (a main server) included in the distributed biometric information management system shown in FIG. 1.

FIG. 1 is a diagram showing a distributed biometric information management system according to an embodiment, and FIG. 2 is a diagram showing the configuration of a first database 100 included in the distributed biometric information management system shown in FIG. 1.

Referring to FIG. 1, the distributed biometric information management system according to the embodiment may include two databases 100 and 200. Although the distributed biometric information management system is shown as including the two databases 100 and 200 in FIG. 1, it may include three or more databases, unlike in the former case.

Of the plurality of databases included in the distributed biometric information management system, any one database may operate as a main server, and the remaining database may operate as a distributed server. FIG. 1 shows an embodiment in which the first database 100 operates as a main server and the second database 200 operates as a distributed server. The main server may control an overall process while communicating with a terminal 10 in a biometric information template registration process or a biometric recognition process, and may transmit necessary requests to the distributed server.

The distributed biometric information management system distributes and stores a biometric information template in the plurality of databases. For example, when a user 1 requests the registration of a facial image through the terminal 10, the first database 100 extracts feature points from the facial image of the user 1 received from the terminal 10, encrypts the feature points, and generates a biometric information template. Thereafter, the first database 100 divides the generated biometric information template into two biometric information template segments, and stores the biometric information template segments in the first database 100 and the second database 200, respectively.

When the distributed biometric information management system receives a biometric recognition request from the user 1, it may perform biometric recognition by comparing biometric information extracted from the user 1 with the pre-stored biometric information template.

Methods of performing biometric recognition may be basically classified into verification and identification, and the individual methods will be briefly described below. 'Verification' refers to verifying whether biometric information of a user matches a specific biometric information template. For example, it is a method in which, when a user transmits information for identifying himself or herself, such as a user ID, to the distributed biometric information management system while requesting biometric recognition, the distributed biometric information management system extracts a biometric information template corresponding to the received user ID, and determines whether the extracted biometric information template matches the biometric information extracted from the user. In other words, when verification is performed, a one-to-one comparison is made between the biometric information extracted from the user and a pre-registered biometric information template.

Meanwhile, 'identification' refers to finding a biometric information template matching biometric information of a user among pre-registered biometric information templates. For example, it is a method in which, when a user requests biometric recognition, a biometric information template matching the biometric information extracted from the user is detected by comparing the biometric information extracted from the user with all biometric information templates previously registered in the distributed biometric information management system. In other words, when identification is performed, one-to-many comparisons are made between the biometric information extracted from the user and the pre-registered biometric information templates.

In the following embodiments, it is assumed that the 'identification' method in which one-to-many comparisons are made between biometric information extracted from a user and pre-registered biometric information templates is employed.

Referring to FIG. 2, the main server 100 of FIG. 1 may include an input/output unit 110, a control unit 120, and a storage unit 130. Although not shown, the distributed server 200 of FIG. 1 may also include the same components as the main server 100 shown in FIG. 2.

The input/output unit 110 is a component configured to receive data, perform an operation on it, and output it. The main server 100 may receive biometric information from the terminal 10 through the input/output unit 110, or may exchange data necessary for biometric recognition with the distributed server 200.

The control unit 120 is a component including at least one processor such as a CPU, and may perform the overall control of the main server 100. The control unit 120 may control processes necessary for biometric recognition to be performed by executing a program stored in the storage unit 130.

The storage unit 130 is a component configured to store files and programs therein, and may be configured via various types of memory. In particular, biometric information template segments for a plurality of users may be stored in the storage unit 130, and a program for performing biometric recognition may be stored in the storage unit 130 and executed by the control unit 120.

A detailed process in which the distributed biometric information management system performs biometric recognition will be described below.

Figure 3:
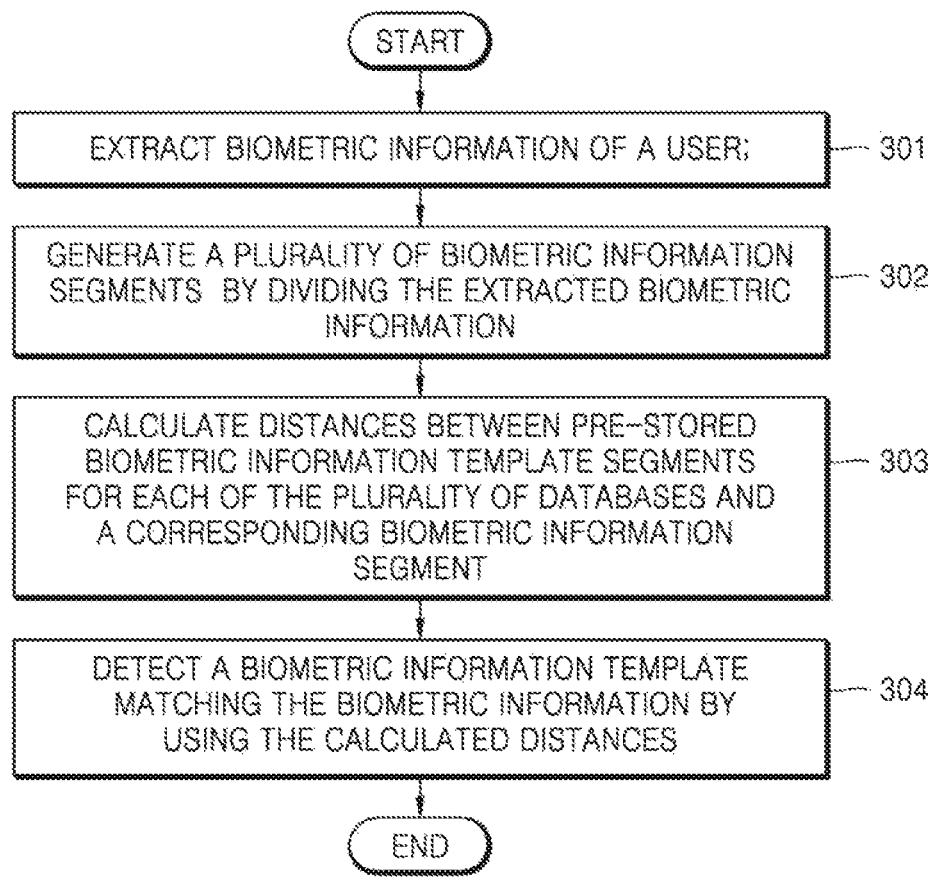
FIGS. 3 and 4 are flowcharts illustrating a biometric recognition method according to an embodiment.

FIG. 3 is a flowchart illustrating a biometric recognition method according to an embodiment.

Referring to FIG. 3, the biometric information of a user is extracted at step 301. For example, when the user 1 requests biometric recognition through the terminal 10, the terminal 10 acquires data (e.g., an image acquired by capturing the face of the user in the case of facial recognition) including the biometric information of the user 1 and transmits it to the main server 100, and the control unit 120 of the main server 100 extracts the biometric information by extracting feature points from the received data and encrypting them. It is obvious that the terminal 10 may directly extract biometric information from the user 1 and then transmit the extracted biometric information to the main server 100.

At step 302, the control unit 120 of the main server 100 generates a plurality of biometric information segments by dividing the biometric information extracted at step 301. In this case, the control unit 120 divides the biometric information to correspond to the biometric information template segments distributed and stored in the main server 100 and the distributed server 200. For example, when biometric information is data having N floats and biometric information template segments each having N/2 floats are stored in the main server 100 and the distributed server 200, the control unit 120 divides the biometric information into two biometric information segments each having N/2 floats. Meanwhile, although the main server 100 has been described as dividing the biometric information in the present embodiment, the main server 100 may transmit the biometric information to the distributed server 200 and the distributed server 200 may divide the biometric information, unlike in the present embodiment.

At step 303, the distributed biometric information management system calculates distances between pre-registered biometric information template segments and a corresponding biometric information segment for each database. According to an embodiment, the main server 100 may transmit a biometric information segment belonging to the biometric information segments obtained through the division at step 302 and corresponding to the distributed server 200 to the distributed server 200, and the main server 100 and the distributed server 200 may each calculate distances between pre-stored biometric information template segments and a corresponding biometric information segment.

The distances may be calculated in various manners. For example, the distances may be calculated using an absolute difference, inner product, or Euclidean distance method. In addition, other methods of calculating distance values having a linear characteristic may be applied to the embodiments described herein.

When the calculation of the distances between the biometric information template segments and the biometric information segment for each database is completed, the distributed biometric information management system detects a biometric information template matching the biometric information by using the distances calculated for each database at step 304.

According to an embodiment, each of the main server 100 and the distributed server 200 calculates distances between pre-stored biometric information template segments and a corresponding biometric information segment, and the distributed server 200 transmits the calculated distances to the main server 100. The main server 100 searches for a biometric information template matching biometric information based on values obtained by adding the received distances to distances calculated by the main server 100 itself. The present embodiment will be described in detail below with reference to FIGS. 4 to 7 (a method of transmitting only distances).

Meanwhile, according to another embodiment, the main server 100 and the distributed server 200 each calculate the distances between pre-stored biometric information template segments and a corresponding biometric information segment, and the distributed server 200 transmits only some biometric information template segments to the main server 100 based on the calculated distances. In greater detail, the distributed server 200 selects biometric information template segments to be transmitted to the main server 100 based on the results of comparing the distances calculated for respective biometric information template segments with a preset reference value. The main server 100 generates biometric information templates by combining the biometric information template segments received from the distributed server 200 with corresponding biometric information template segments, and compares the generated biometric information templates with the biometric information extracted from the user (e.g., by calculating distances between the biometric information templates and the biometric information), thereby detecting a biometric information template matching the biometric information of the user. The present embodiment will be described in detail below with reference to FIGS. 8 to 11 (a method of transmitting only some biometric template segments).

1. Detailed Description of a Method of Transmitting Only Distances

The method of transmitting only distances will be described below in detail.

Figure 4:
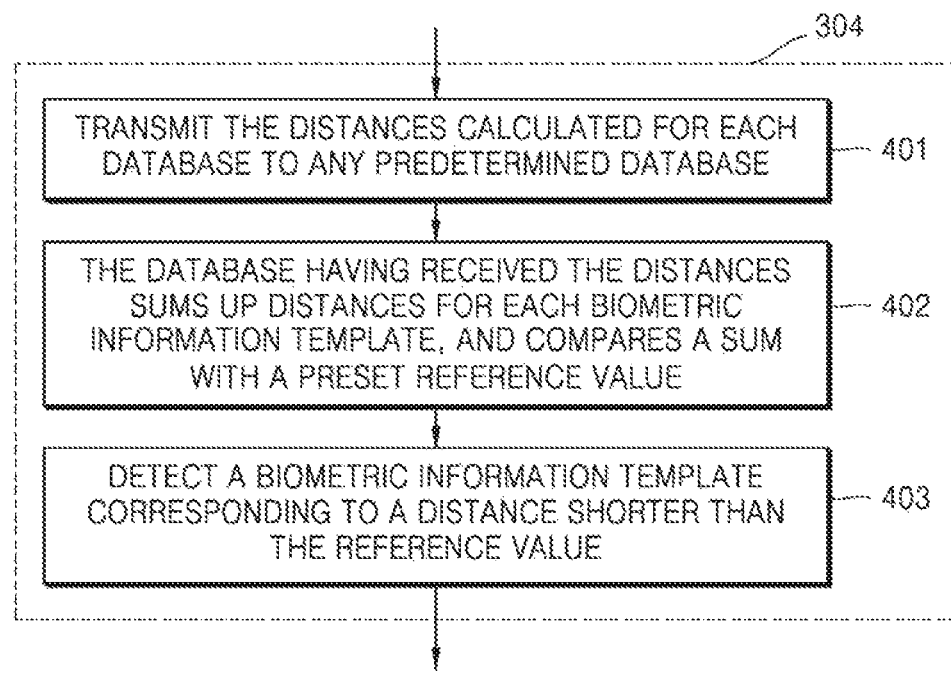

FIG. 4 is a flowchart showing detailed steps included in step 304 of FIG. 3. Referring to FIG. 4, at step 401, the distributed biometric information management system transmits the distances calculated for each database to any one predetermined database. For example, a plurality of databases included in the distributed biometric information management system may be transmitted to a database designated as a main server.

At step 402, the database (the main server) that has received the distances sums up distances for each biometric information template and compares a resulting sum with a preset reference value.

At step 403, the main server detects a biometric information template corresponding to a distance shorter than the preset reference value.

Figure 5:
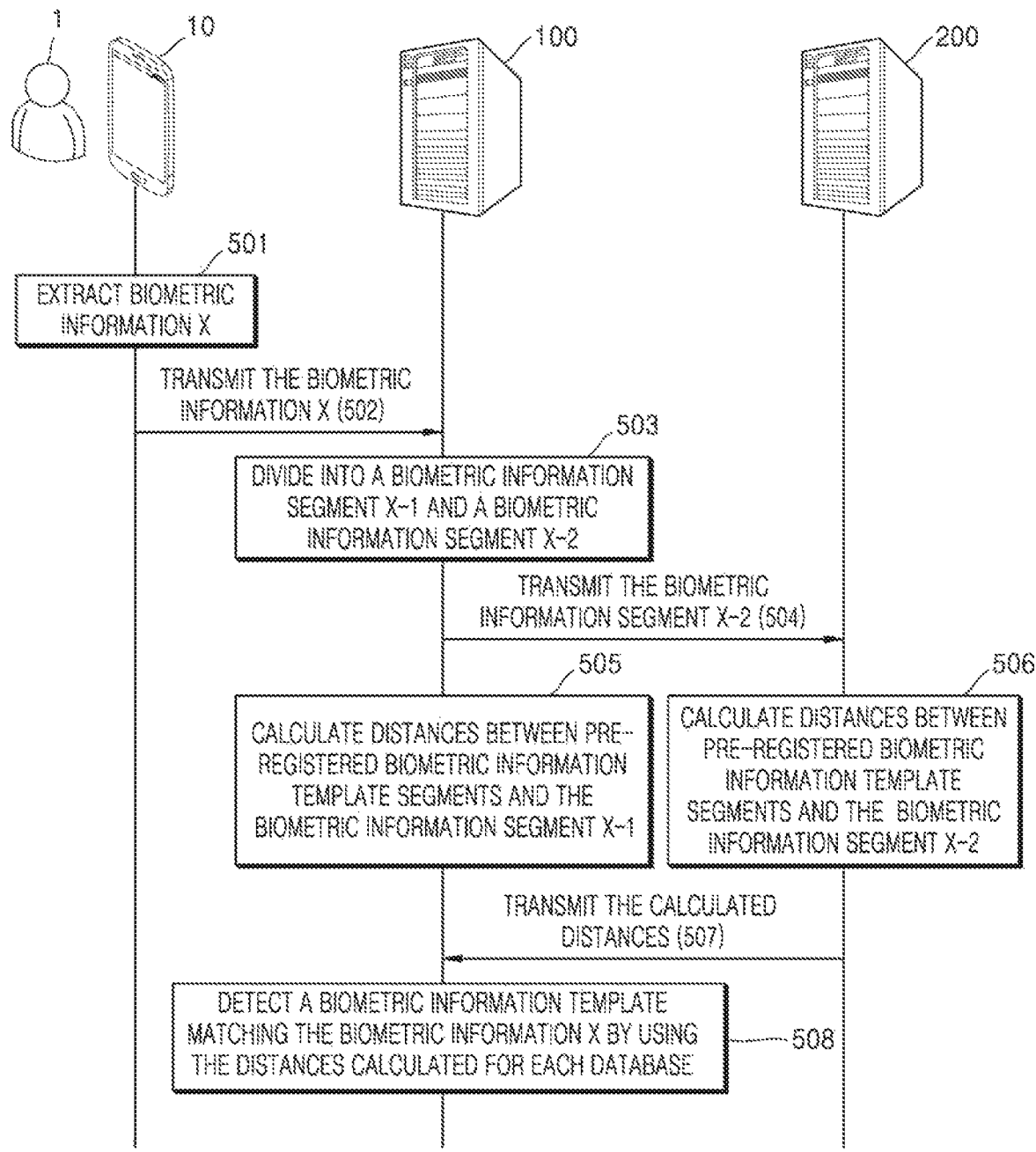
FIG. 5 is a diagram illustrating a process in which biometric recognition is performed in a distributed biometric information management system according to an embodiment.
Figure 6:
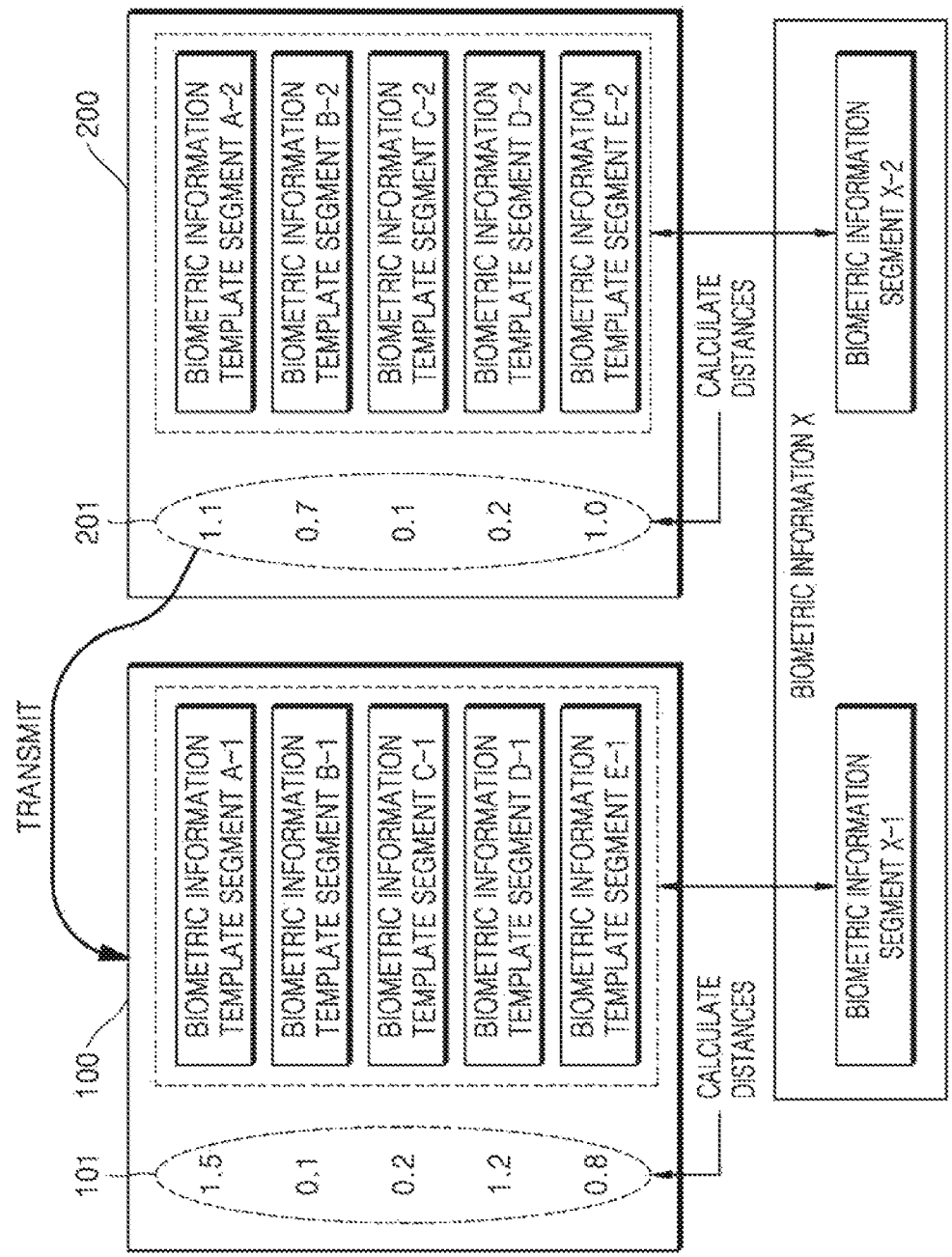
FIGS. 6 and 7 are diagrams illustrating an example of performing biometric recognition by calculating distances for each database and transmitting the calculated distances in accordance with a biometric recognition method according to an embodiment.
Figure 7:
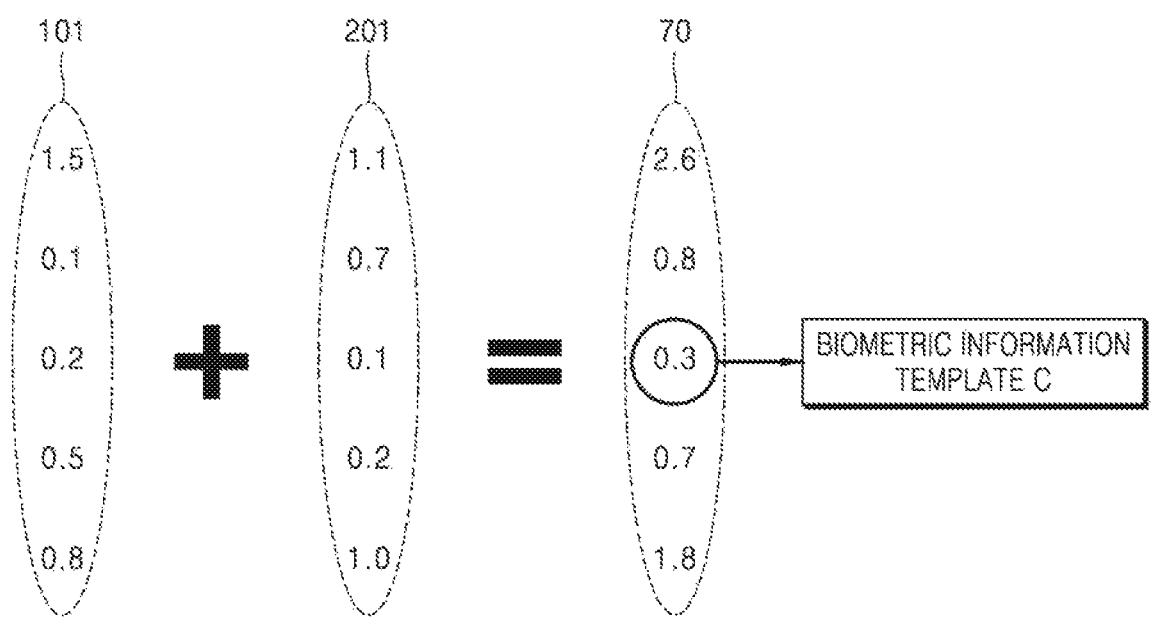

FIG. 5 is a diagram illustrating a process in which biometric recognition is performed in a distributed biometric information management system according to an embodiment. In FIGS. 6 and 7, there is shown a specific example of calculating distances for each database according to the process shown in FIG. 5 and transmitting only the calculated distances to the main server.

The terminal 10 extracts biometric information X from the user 1 at step 501, and transmits the extracted biometric information X to the main server 100 at step 502.

The main server 100 divides the biometric information X into biometric information segments X-1 and X-2 at step 503, and transmits the biometric information segment X-2 to the distributed server 200 at step 504.

The main server 100 calculates distances between pre-registered biometric information template segments and the biometric information segment X-1 at step 505, and the distributed server 200 calculates distances between pre-registered biometric information template segments and the biometric information segment X-2 at step 506.

In the detailed embodiment shown in FIG. 6, biometric information templates A to E are each divided into two biometric information template segments, and are distributed and stored in the main server 100 and the distributed server 200. The main server 100 calculates distances between biometric information template segments A-1 to E-1 and a biometric information segment X-1. In a region 101, the distances calculated for the respective biometric information template segments in the main server 100 are shown. In a similar manner, the distributed server 200 calculates distances between biometric information template segments A-2 to E-2 and a biometric information segment X-2. In a region 201, the distances calculated for the respective biometric information template segments in the distributed server 200 are shown.

The distributed server 200 transmits the calculated distance 201 to the main server 100 at step 507, and the main server 100 detects a biometric information template matching biometric information X by using the distances calculated for each database at step 508. In greater detail, when the main server 100 receives the calculated distances 201 from the distributed server 200, the main server 100 calculates total distances 70 by adding the distances 101 calculated in the main server 100 and the distances 201 calculated in the distributed server 200, respectively, as shown in FIG. 7. The main server 100 detects a biometric information template matching the biometric information X by comparing the total distances 70 with a preset reference value. For example, when the reference value is set to 0.5, the main server 100 determines that a biometric information template C corresponding to 0.3, which is a distance shorter than the reference value, matches the biometric information X.

As described above, when performing biometric recognition, the distributed biometric information management system transmits only distances calculated for each database to another database instead of transmitting biometric information template segments distributed and stored in a plurality of databases to another database, thereby maintaining recognition accuracy at a high level while significantly reducing the amount of data to be transmitted compared to the conventional method.

2. Detailed Description of a Method of Transmitting Only Some Biometric Template Segments The method of transmitting only some of the biometric information template segments will be described in detail below.

Figure 8:
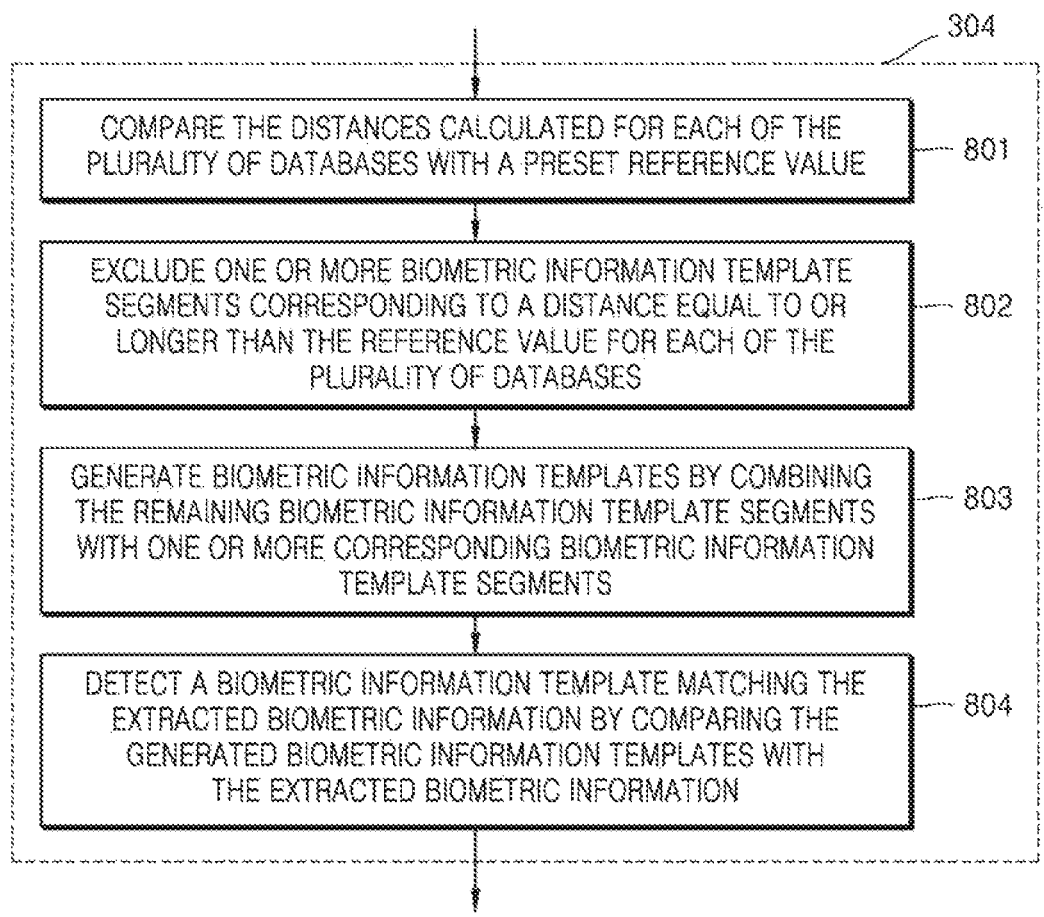
FIG. 8 is a flowchart illustrating a biometric recognition method according to an embodiment.

FIG. 8 is a flowchart illustrating a biometric recognition method according to an embodiment. Referring to FIG. 8, at step 801, the distributed biometric information management system compares distances calculated for each database with a preset reference value. The higher the reference value, the smaller the number of biometric information template segments excluded at step 802. Accordingly, the effect of reducing the amount of data to be transmitted is low.

However, in this case, the probability that a biometric template matching the biometric information of a user is excluded is lowered, so that recognition accuracy is increased. In contrast, the lower the reference value, the larger the number of biometric information template segments excluded at step 802. Accordingly, the effect of reducing the amount of data to be transmitted is high. However, in this case, the probability that a biometric template matching the biometric information of a user is excluded is increased, so that recognition accuracy is decreased. Accordingly, the reference value may be set to an appropriate value to effectively filter out only biometric information templates having low matching probability by taking into consideration these advantages and disadvantages.

The distributed biometric information management system excludes biometric information template segments corresponding to distances longer than or equal to a preset reference value for each database at step 802, and generates biometric information templates by combining the remaining biometric information template segments excluded at step 802 with corresponding biometric information template segments at step 803. To this end, each database may transmit the remaining biometric information template segments to any one database (a main server).

At step 804, the distributed biometric information management system detects a biometric information template corresponding to biometric information extracted from the user by comparing the biometric information templates generated at step 803 with the biometric information extracted from the user.

Figure 9:
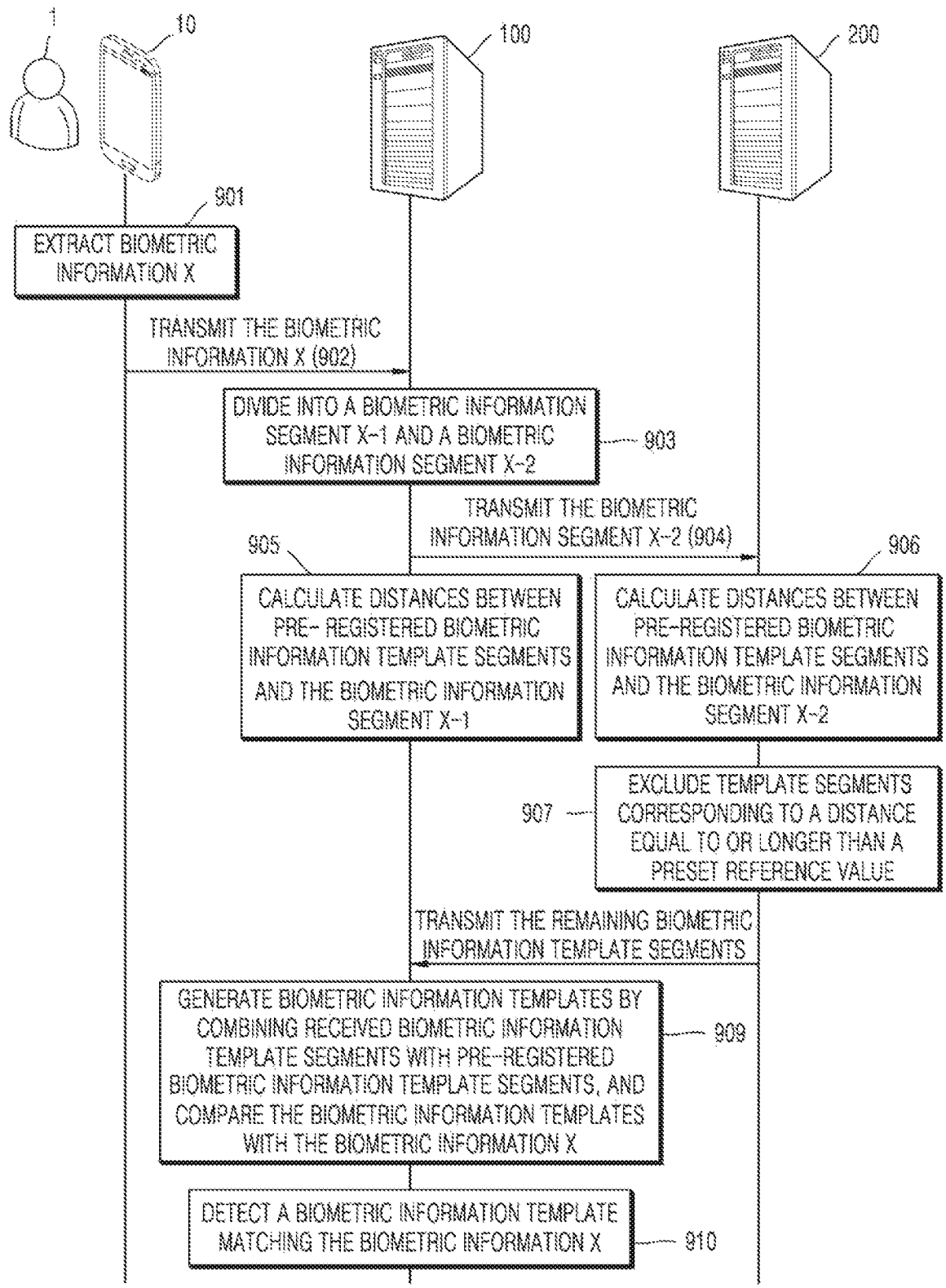
FIG. 9 is a diagram illustrating a process in which biometric recognition is performed in a distributed biometric information management system according to an embodiment.
Figure 10:
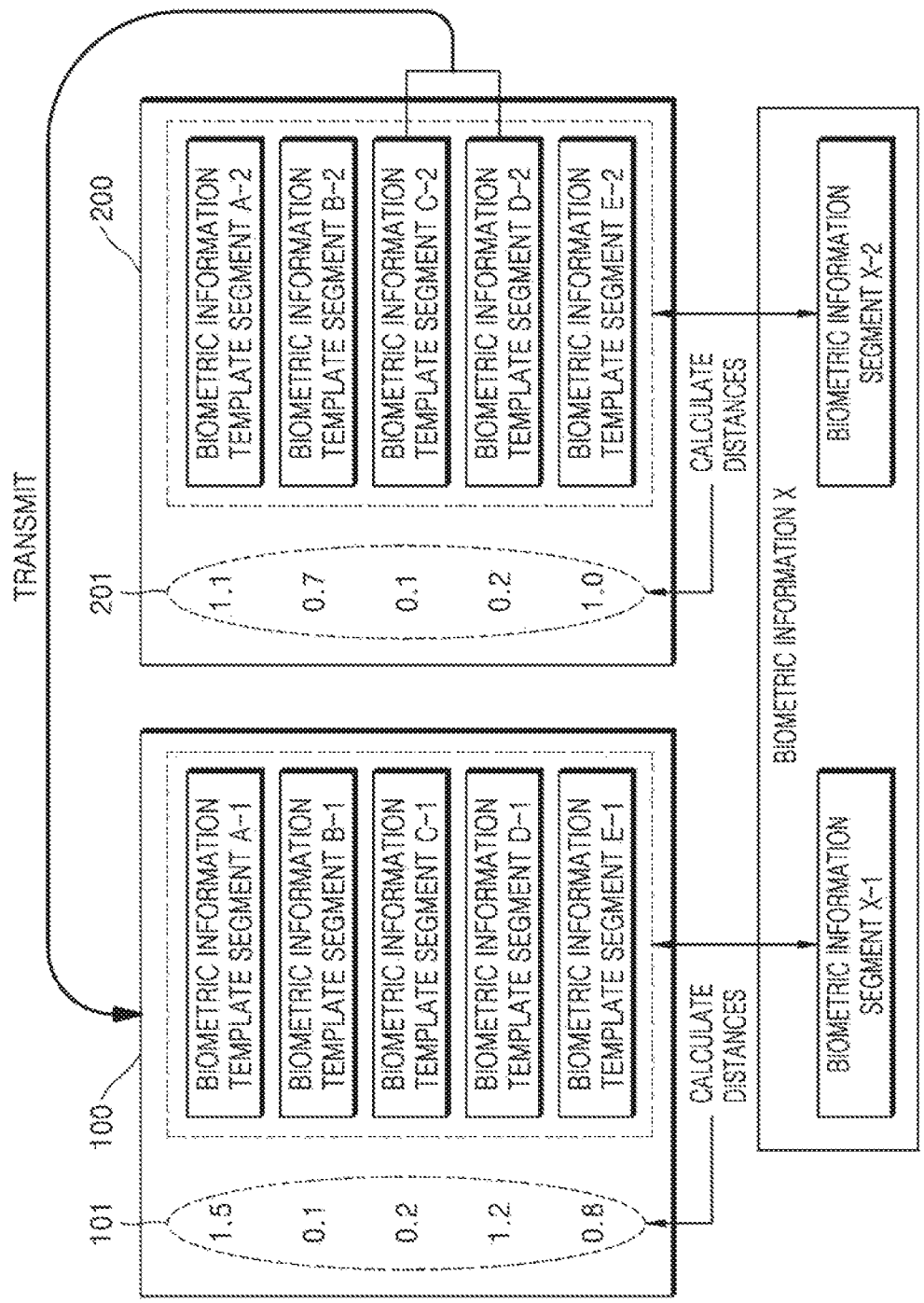
FIGS. 10 and 11 show a specific example of performing biometric recognition by calculating distances for each database and transmitting only some biometric information template segments in accordance with a biometric recognition method according to an embodiment.
Figure 11:
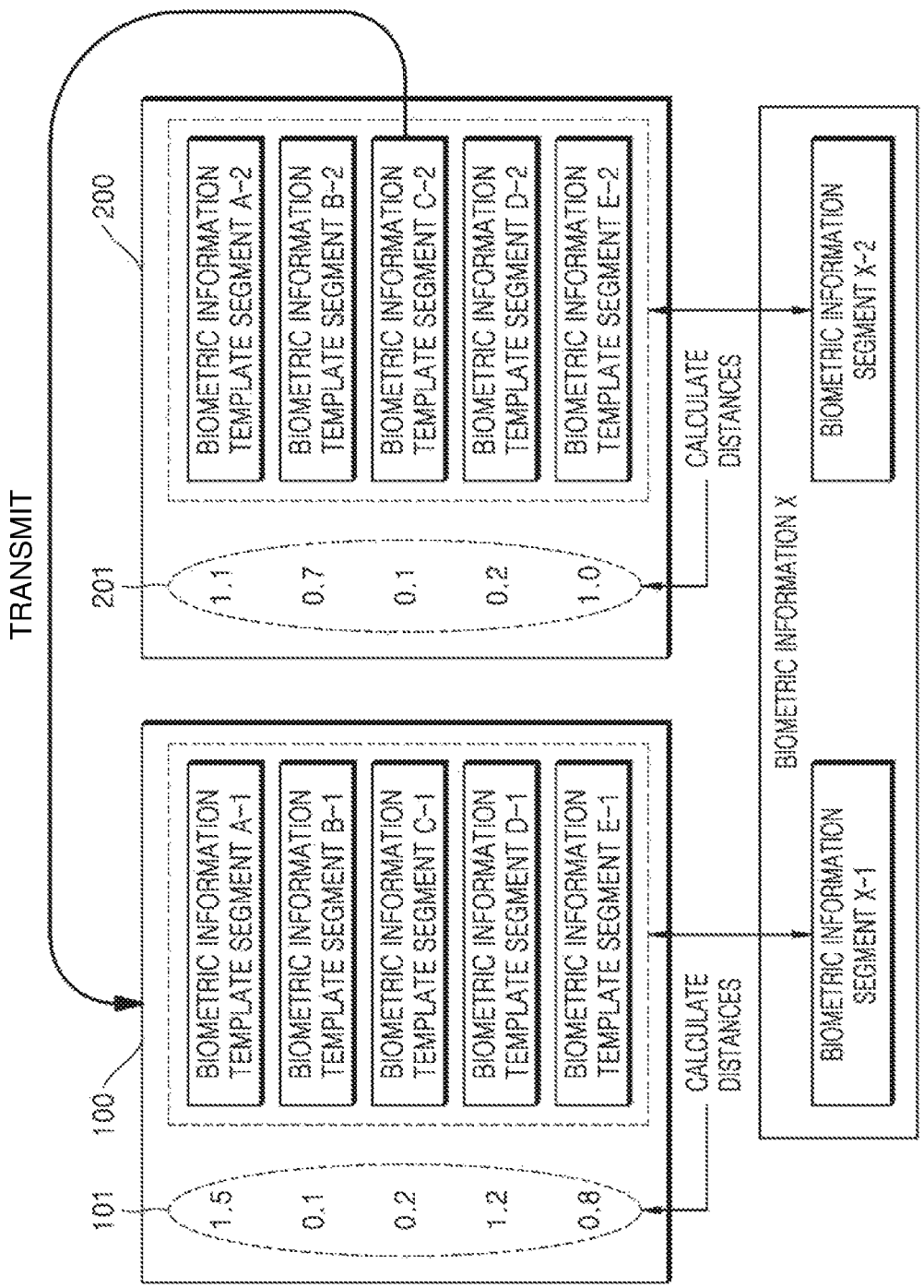

FIG. 9 is a diagram illustrating a process in which biometric recognition is performed in a distributed biometric information management system according to an embodiment, and FIGS. 10 and 11 show a specific example of calculating distances for each database according to the process shown in FIG. 9 and transmitting only some biometric information template segments to the main server.

The terminal 10 extracts biometric information X from the user 10 at step 901, and transmits the extracted biometric information X to the main server 100 at step 902.

The main server 100 divides the biometric information X into a biometric information segment X-1 and a biometric information segment X-2 at step 903, and transmits the biometric information segment X-2 to the distributed server 200 at step 904.

The main server 100 calculates distances between pre-registered biometric information template segments and the biometric information piece X-1 at step 905, and the distributed server 200 calculates distances between pre-registered biometric information template segments and the biometric information segment X-2 at step 906.

In the embodiment shown in FIG. 10, biometric information templates A to E are each divided into two biometric information template segments and are distributed and stored in the main server 100 and the distributed server 200. The main server 100 calculates distances between biometric information template segments A-1 to E-1 and a biometric information segment X-1. In a region 101, the distances calculated for the respective biometric information template segments in the main server 100 are shown. In a similar manner, the distributed server 200 calculates distances between respective biometric information template segments A-2 to E-2 and a biometric information segment X-2. In a region 201, the distances calculated for the respective biometric information template segments in the distributed server 200 are shown.

The distributed server 200 excludes biometric information template segments corresponding to a distance longer than or equal to a preset reference value from targets to be transmitted to the main server 100 at step 907, and transmits the remaining biometric information template segments to the main server 100 at step 908. A long distance between a biometric information template segment and a biometric information segment implies that the probability that a biometric information template corresponding to the biometric information template segment matches biometric information is low. A biometric information template segment corresponding to a distance above a predetermined level may be preferentially excluded.

In FIG. 10, for example, when the reference value is set to 0.4, the distributed server 200 excludes the biometric information template segments A-2, B-2, and E-2, and transmits only the remaining biometric information template segments C-2, and D-2 to the main server 100.

Meanwhile, as shown in FIG. 11, biometric information template segments corresponding to a distance longer than or equal to a preset reference value are excluded from each of the main server 100 and the distributed server 200, and only biometric information template segments remaining in common in the two databases 100 and 200 may be transmitted to the main server 100. For example, when the reference value is set to 0.4, biometric information template segments A-1, D-1, and E-1 are excluded in the main server 100 and biometric information template segments A-2, B-2 and E-2 are excluded in the distributed server 200 in FIG. 11. Accordingly, the distributed server 200 transmits only a biometric information template segment C-2, which is the remaining biometric information template segment in common to both sides, to the main server 100.

The main server 100 generates biometric information templates by combining the biometric information template segments received from the distributed server 200 with the pre-registered biometric information template segments and compares the generated biometric information templates with biometric information X at step 909, and detects a biometric information template matching the biometric information X at step 910.

For example, in FIG. 10, the main server 100 generate[ biometric information templates C and D by combining the biometric information template segments C-1 and D-1 with the biometric information template segments C-2 and D-2, respectively. Thereafter, the main server 100 calculates distances between the biometric information templates C and D and the biometric information X, and compares the calculated distances with a preset reference value, thereby determining whether there is a match.

Furthermore, for example, in FIG. 11, since the main server 100 receives only the biometric information template segment C-2, the biometric information template segment C-2 is combined with the biometric information template segment C-1 to generate a biometric information template C.

Thereafter, the main server 100 calculates a distance between the biometric information template C and the biometric information X, and compares the calculated distance with a preset reference value, thereby determining whether there is a match.

As described above, the distributed biometric information management system selects biometric information template segments to be transmitted based on distances calculated for each database and then transmits only the selected biometric information template segments to the main server, rather than transmitting all biometric information template segments distributed and stored in individual databases to one database (a main server), thereby maintaining recognition accuracy at a high level while reducing the amount of data to be transmitted compared to the conventional method.

When the 'method of transmitting only distance' described with reference to FIGS. 4 to 7 and 'the method of transmitting only some biometric information template segments' described with reference to FIGS. 8 to 11 are compared with each other, the 'method of transmitting only distance' has a higher effect of reducing the amount of data to be transmitted, but has lower accuracy because, even when calculated distances have a linear characteristic, the sum of distances calculated for respective biometric information template segments may be different from the distance calculated for an intact biometric information template. Therefore, one of the methods may be selected and used according to a situation by taking into consideration the advantages and disadvantages of the methods.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit (s)' may be coupled to a smaller number of components and 'unit (s)' or divided into a larger number of components and 'unit (s).' In addition, components and 'unit(s)' may be implemented to run one or more CPUs in a device or secure multimedia card.

Each of the biometric recognition methods using a distributed biometric information management system according to the embodiments described with reference to FIGS. 3 to 11 may be implemented in the form of a computer-readable medium that stores instructions and data that can be executed by a computer. In this case, the instructions and the data may be stored in the form of program code, and may generate a predetermined program module and perform a predetermined operation when executed by a processor.

Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, each of the biometric recognition methods using a distributed biometric information management system according to the embodiments described with reference to FIGS. 3 to 11 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, each of the biometric recognition methods using a distributed biometric information management system according to the embodiments described with reference to FIGS. 3 to 11 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A method for performing biometric recognition in a system in which biometric information is distributed and stored in a plurality of databases, the method comprising:
    extracting biometric information of a user;
    generating a plurality of biometric information segments by dividing the extracted biometric information;
    calculating distances between pre-stored biometric information template segments for each of the plurality of databases and a corresponding one of the plurality of biometric information segments; and
    detecting a biometric information template matching the biometric information by using the calculated distances,
    wherein detecting the biometric information template comprises:
        comparing the distances calculated for each of the plurality of databases with a preset reference value;
        transmitting to any predetermined one of the databases, excluding one or more biometric information template segments corresponding to a distance equal to or longer than the reference value for each of the plurality of databases, with one or more corresponding biometric information template segments;
        generating, by the any one database, the at least one biometric information template by combining the received at least one biometric information template segment with one or more corresponding biometric information template segments; and
        detecting, by the any one database, a biometric information template matching the extracted biometric information by comparing the generated biometric information template with the extracted biometric information.

2. The method of claim 1, wherein generating the at least one biometric information template comprises:
    transmitting at least one biometric information template segment, remaining in each of the plurality of databases, to any predetermined one of the databases; and
    generating, by the any one database, the at least one biometric information template by combining the received at least one biometric information template segment with one or more corresponding biometric information template segments.

3. The method of claim 1, wherein generating the at least one biometric information template comprises:
    transmitting a biometric information template segment corresponding to at least one biometric information template segment, remaining in common in the plurality of databases, to any predetermined one of the databases; and
    generating, by the any one database, the at least one biometric information template by combining the received at least one biometric information template segment with one or more corresponding biometric information template segments.

4. The method of claim 1, wherein generating the plurality of biometric information segments comprises dividing the biometric information to correspond to the biometric information template segments distributed and stored in the plurality of databases.

5. The method of claim 1, wherein calculating the distances comprises:
    transmitting the plurality of generated biometric information segments to the respective databases; and
    calculating distances between the biometric information segment received by each of the databases and the biometric information template segments previously stored in each of the databases.

6. The method of claim 1, wherein calculating the distances comprises calculating the distances using any one of absolute difference, inner product, and Euclidean distance methods.

7. A computer-readable storage medium having stored thereon a program for performing the method set forth in claim 1.

8. A distributed biometric information management system including a plurality of databases, the distributed biometric information management system comprising:
    a main server configured to be a database selected from the plurality of databases and to control a biometric process; and
    at least one distributed server configured to be a database belonging to the plurality of databases and excluding the main server;
    wherein the main server generates a plurality of biometric information segments by dividing the biometric information extracted from the user;
    wherein each of the main server and the at least one distributed server calculates distances between pre-stored biometric information template segments and a corresponding one of the biometric information segments; and
    wherein the main server detects a biometric information template matching the biometric information by using the calculated distances,
    wherein the main server generates at least one biometric information template by combining at least one remaining biometric information template segment received from distributed server, excluding one or more biometric information template segments corresponding to a distance equal to or longer than the reference value for each of the plurality of databases, with one or more corresponding biometric information template segments, and detects a biometric information template matching the extracted biometric information by comparing the generated biometric information template with the extracted biometric information.

9. The distributed biometric information management system of claim 8, wherein:
    the at least one distributed server transmits at least one biometric information template segment, remaining in each of the plurality of databases, to the main server; and
    the main server generates the at least one biometric information template by combining the received at least one biometric information template segment with one or more corresponding biometric information template segments.

10. The distributed biometric information management system of claim 8, wherein:
    the at least one distributed server transmits a biometric information template segment corresponding to at least one biometric information template segment, remaining in common in the main server and the at least one distributed server, to the main server; and
    the main server generates the at least one biometric information template by combining the received at least one biometric information template segment with one or more corresponding biometric information template segments.

11. The distributed biometric information management system of claim 8, wherein the main server divides the biometric information to correspond to the biometric information template segments distributed and stored in the plurality of databases.

12. The distributed biometric information management system of claim 8, wherein:
   the main server transmits the plurality of generated biometric information segments to at least one corresponding distributed server; and
   each of the main server and the at least one distributed server calculates distances between the received biometric information segment and the pre-stored biometric information template segments.

13. The distributed biometric information management system of claim 8, wherein the main server and the at least one distributed server calculate the distances using any one of absolute difference, inner product, and Euclidean distance methods.

* * * * *